US009654958B2

(12) United States Patent
Mandanapu

(10) Patent No.: US 9,654,958 B2
(45) Date of Patent: May 16, 2017

(54) SYSTEM AND METHOD FOR PROVIDING TOLL-FREE APPLICATION DATA ACCESS

(71) Applicant: Orange, Paris (FR)

(72) Inventor: Subash Mandanapu, Fremont, CA (US)

(73) Assignee: ORANGE, Paris (FR)

( * ) Notice: Subject to any disclaimer, the term of this patent is extended or adjusted under 35 U.S.C. 154(b) by 0 days.

(21) Appl. No.: 15/107,393

(22) PCT Filed: Dec. 15, 2014

(86) PCT No.: PCT/IB2014/003049
§ 371 (c)(1),
(2) Date: Jun. 22, 2016

(87) PCT Pub. No.: WO2015/097551
PCT Pub. Date: Jul. 2, 2015

(65) Prior Publication Data
US 2017/0006451 A1    Jan. 5, 2017

Related U.S. Application Data
(60) Provisional application No. 61/920,178, filed on Dec. 23, 2013.

(51) Int. Cl.
*H04W 4/24* (2009.01)
*H04L 12/14* (2006.01)

(52) U.S. Cl.
CPC .......... *H04W 4/24* (2013.01); *H04L 12/1407* (2013.01); *H04L 12/1425* (2013.01); *H04L 12/1435* (2013.01)

(58) Field of Classification Search
CPC .. H04W 4/24; H04L 12/1407; H04L 12/1435; H04L 12/1425
See application file for complete search history.

(56) References Cited

U.S. PATENT DOCUMENTS

| | | | |
|---|---|---|---|
| 2008/0159175 A1* | 7/2008 | Flack | H04L 12/2602 370/257 |
| 2014/0358989 A1* | 12/2014 | Xia | H04L 67/2814 709/203 |

FOREIGN PATENT DOCUMENTS

| | | |
|---|---|---|
| WO | 2005057370 A2 | 6/2005 |
| WO | 2012172430 A2 | 12/2012 |
| WO | 2014207550 A2 | 12/2014 |

OTHER PUBLICATIONS

International Search Report and Written Opinion dated May 27, 2015 for corresponding International Application No. PCT/IB2014/003049, filed Dec. 15, 2014.

* cited by examiner

*Primary Examiner* — Brandon Miller
(74) *Attorney, Agent, or Firm* — David D. Brush; Westman, Champlin & Koehler, P.A.

(57) ABSTRACT

Toll-free application data network access is disclosed. A device for providing data connectivity includes a connection detector configured to receive a data connectivity request from an application installed on the device, a configuration manager for retrieving a configuration file for the application identified from the data connectivity request, the configuration file defining conditions to allow connectivity for the application under operator specific billing, and an authorization module configured to access the configuration file, tag the data connectivity request with a first tag if the data connectivity request matches the conditions of the configuration file, the tag being indicative of operator specific billing for the application, and leave the data connectivity request unchanged otherwise.

8 Claims, 9 Drawing Sheets

SYSTEM AND METHOD FOR PROVIDING TOLL-FREE APPLICATION DATA ACCESS

CROSS-REFERENCE TO RELATED APPLICATIONS

This Application is a Section 371 National Stage Application of International Application No. PCT/IB2014/003049, filed Dec. 15, 2014, published as WO 2015/097551 A1 on Jul. 2, 2015, in English, which is based on and claims the benefit of U.S. Provisional Patent Application No. 61/920,178, filed Dec. 23, 2013; the contents of which are hereby incorporated by reference in their entireties.

BACKGROUND

Field

The present application relates generally to acquiring access to a data network and more specifically to systems, methods, and devices for toll-free application data network access.

Description of Related Technology

In many telecommunication systems, the operators of a network control which electronic devices can access the network as well as the degree of access permitted. The access may be controlled by a subscription. The subscription is generally an agreement between the user of an electronic device and a network operator. The agreement typically includes payment for access.

As devices become more robust, the content available for display via the devices also increases. The devices may process more data in a faster way to provide enhanced user experiences. For example, electronic devices such as smartphones are capable of downloading high-definition video content via a cellular/LTE/3G connection for display on the smartphone.

While the devices may be consuming more data, the users must account for the increased data obtained via the network. To help curb the overall network impact, some network operators have introduced limited data plans. These limited plans allow a fixed quantity of data access for a device, through e.g. an allowable quantity per month. Should a particular device consume more than the plan amount, the user of such a device is either cutoff from further access or permitted additional access at an extra, perhaps, cost.

Furthermore, some devices are available without a data plan. Such devices may be configured to execute applications such as a video or music player. These devices may attach to a data network using a Wi-Fi network, but, due to the lack of a contract, are unable to access the data network via cellular/LTE/3G connections.

Accordingly, devices, systems, and methods for permitting toll-free application data network access on an application-by-application basis are desirable.

SUMMARY OF CERTAIN INNOVATIVE ASPECTS

In one innovative aspect, there is a device for providing data connectivity. The device includes a connection detector configured to receive a data connectivity request from an application installed on the device, a configuration manager for retrieving a configuration file for the application identified from the data connectivity request, the configuration file defining conditions to allow connectivity for the application under operator specific billing, an authorization module configured to access the configuration file, tag the data connectivity request with a first tag if the data connectivity request matches the conditions of the configuration file, the tag being indicative of operator specific billing for the application, and leave the data connectivity request unchanged otherwise.

Thanks to the present system, provided a configuration file is found for an application, the application may be handled by the network differently than a regular application, i.e. how its data activities are billed to the user. The experience is transparent to the user, who may enjoy data connectivity for an application beyond a data plan with his network operator that may run out before the user is done using the application. The application does not need to be changed, only a configuration file provided to the device, which will, through e.g. the help of an agent, authorize and tag the data connectivity requests from the application differently.

In another innovative aspect, there is a method of providing data connectivity. The method includes receiving a data connectivity request from an application installed on the device, retrieving a configuration file for the application identified from the data connectivity request, the configuration file defining conditions to allow connectivity for the application under operator specific billing, tagging the data connectivity request with a first tag if the data connectivity request matches the conditions of the configuration file, the tag being indicative of operator specific billing for the application, and leaving the data connectivity request unchanged otherwise.

In a further innovative aspect, there is a computer-readable storage medium comprising instructions executable by a processor of an apparatus. The instructions cause the apparatus to perform the method of providing data connectivity described above.

The systems, methods, and devices of the invention each have several aspects, no single one of which is solely responsible for its desirable attributes. Without limiting the scope of this invention as expressed by the claims which follow, some features will now be discussed briefly. After considering this discussion, and particularly after reading the section entitled "Detailed Description" one will understand how the features of this invention provide advantages that include toll-free cross carrier data network access.

DETAILED DESCRIPTION OF CERTAIN ILLUSTRATIVE EMBODIMENTS

Figure 1:
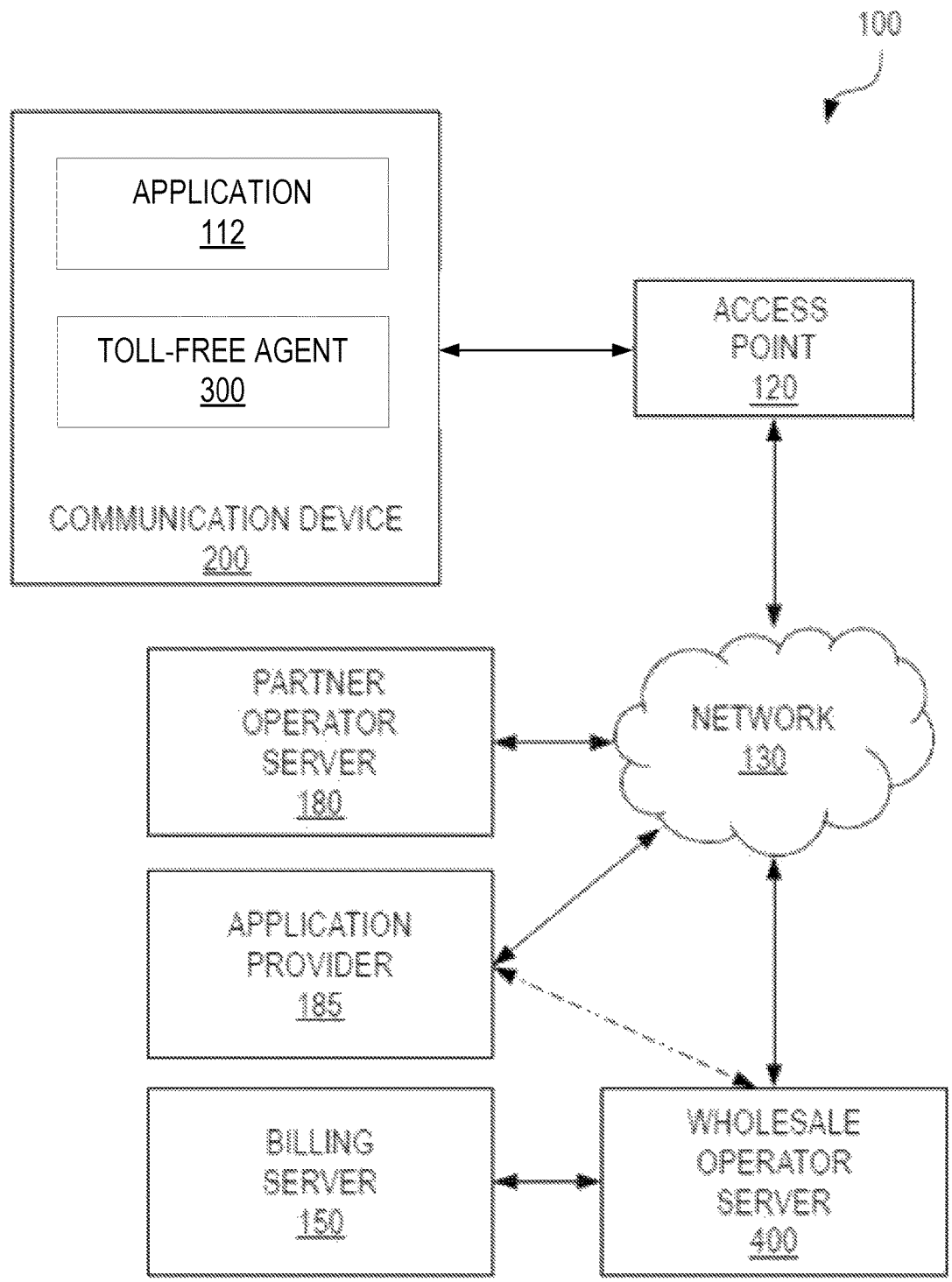
FIG. 1 is a functional block diagram of an example communication network system.

In one aspect, an architecture comprising a first application operable to request data connection to a telecommunication network in a client/server mode is provided. The architecture also includes a toll free agent operable to detect triggering of the first application (or intercept a data connectivity request for data from server), retrieve a configuration file defining conditions to allow connectivity for the first application, use the configuration file to tag the data connectivity request with a first tag if the data connectivity request matches the conditions of the configuration file, the tag being indicative operator specific billing for the application from the resource.

Some network operators may find a benefit in partnering with third party companies, also referred later on as content provider, to offer toll-free (e.g., no charge) or discounted connectivity for applications. By toll-free application, also referred as prepaid application here after, one may understand that the connectivity needed by such an application is paid by a third party company, instead of the regular data plan of the user. For example, the companies may offer prepaid applications that would allow a user to access and use an application for a certain amount of time or data, even in a roaming situation. Such an application could allow for instance access to a content source controlled by a third party company, the actual billing of the access being handled between the network operator and the third party company, transparently to the user.

The systems and methods described herein provide the management of the toll-free connectivity without the need for user interaction. This is achieved in-part via an toll-free agent hosted on an electronic device that tags data and data requests for a regular application, the tag being indicative of operator specific billing for the application. The agent is generally arranged to detect triggering of the application, e.g. through intercepting a data connectivity request from the application or detecting a task open by the device processor for that application. Once triggered, the agent may retrieve a configuration file associated to the application, the configuration file defining conditions to allow connectivity for the application. The agent will then tag the connectivity request based on the conditions. The tag identifies a specific billing plan for the application. Alternatively, the agent may not tag the connectivity request so that the application is run normally, i.e. under the regular plan of the user. The agent may report monitored data usage for the application to the network. Through the use of an agent, the billing of the application may not be charged to the user or charged at a discounted rate.

As one example, consider a content provider like "Mega-Sports." MegaSports, that is also considered here as the provider to an application, may develop an application which may execute on mobile devices but requires access to a data network to obtain the content. MegaSports may negotiate a global wholesale data access deal with network operator like SuperTelco. The deal may define the data connectivity policy (data or connectivity policy in short), i.e. specify various data access limits for traffic associated with the MegaSports application. Examples of these limits may include one or more of a maximum data limit, per data unit (e.g., byte, megabyte, gigabyte) price, and geographic coverage, service level agreements (SLAs) on mobile, fixed, per user limits, etc. SuperTelco may provide a toll-free agent to control the data connections of the MegaSports application. Based on the deal with MegaSports, SuperTelco will provide a MegaSports configuration file comprising the data connectivity policy, i.e. defining the conditions to allow connectivity for the MegaSports application. MegaSports can distribute the application, along with the configuration file, through multiple distribution channels including application stores, SIM cards, hardware attachment (e.g., earphones, sensor, etc.), and the like. Alternatively SuperTelco may provide the configuration file in response to the request from the MegaSports application. When a customer of SuperTelco tries to use the MegaSports application, SuperTelco may identify the application traffic as related to MegaSports and manage the session until the negotiated quota expires. This may include refraining from billing the user for application traffic for the MegaSports application.

When some user is accessing a partner network, such as OtherTelco, the application data connectivity requests may be routed to SuperTelco to validate access (e.g., via APIs). Once validated SuperTelco can provide OtherTelco with SLAs and per user quota limits. OtherTelco may manage the end user session including allowing traffic to and from the MegaSports application based on the provided information. Upon completion of a user session or another designated time, OtherTelco may send a clearance request to SuperTelco. The clearance request may include the amount owed to OtherTelco for allowing the application traffic for the MegaSports application. SuperTelco may then settle the charges to OtherTelco.

One non-limiting advantage of the described aspects is the ability to provide a data rich application in way that does not require the user to pay for accessing. The bargain of receiving the user's usage data in exchange for free data access subsidized by the application provider, such as MegaSports, may be an attractive bargain.

A further non-limiting advantage of the described aspects is the transparency to the user and the application provider. In part because the toll-free agents controls how the application connections can be charged, the functions of the application may be monitored and managed to provide the toll-free experience through a simple provision of an application configuration file.

Another non-limiting advantage of the described aspects is the application can access a network controlled by a wholesale network operator who has negotiated the prepaid application with the application provider. The application may also access a network controlled by a partner network operator (e.g., roaming). In such implementations, the partner may allow the application toll-free access and instead of charging the user, the partner can reconcile the cost of the access with the wholesale operator. Furthermore, devices without a traditional cellular data plan may use aspects described to use a data rich application.

Various aspects of the novel systems, apparatuses, and methods are described more fully hereinafter with reference to the accompanying drawings. The teachings disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, and methods disclosed herein, whether implemented independently of or combined with any other aspect of the invention. For example, an apparatus may be implemented or a method may be practiced using any number of the aspects set forth herein. In addition, the scope of the invention is intended to cover such an apparatus or method which is practiced using other structure, functionality, or structure and functionality in addition to or other than the various aspects of the invention set forth herein. It should be understood that any aspect disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different data access technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

FIG. 1 is a functional block diagram of an example communication network system. The system 100 includes an electronic or communication device 200. The communication device 200 may be an electronic communication device such as a mobile phone, a smart phone, a tablet computer, a personal computer, a game console, a set-top box, or other communication device configured to transmit/receive data.

The communication device 200 may include an application 112. An application may generally refer to an installed capability for the communication device 200. More generally, the expressions application or application program (AP) in the present description may be taken in a very general sense, and may be seen as any tool that functions and is operated by means of a computer, with the purpose of performing one or more functions or tasks for a user or another application program. To interact with and control an AP, a graphical user interface (GUI) of the AP may be displayed on the display of the electronic device. Example applications include a web browser, a movie viewer, a music player, a newsreader, a document editor, or other functional additions to the communication device 200. The application 112 may be installed on the communication device 200 by the manufacturer, a network operator providing service for the device, and/or a user of the communication device 200. The application 112 may be installed once hardware is attached to the communication device 200. For example, attaching a sensor to the communication device 200 may cause the execution/installation of the application 112. The installation may be performed at the time of manufacture, via over the air (OTA) provisioning, via storage coupled to the communication device 200 such as a SIM card, or other suitable installation means.

The application 112 may request network access, i.e. connectivity, for running or providing tasks to the user. For instance, an application provider may generate a new interactive game that will require network access for playing the game. In the present system, the application is associated to an application configuration file defining conditions to allow connectivity for the application. The application may request network access via a toll-free agent 300 for playing the game. The agent 300 may intercept the network access request, also referred to here after as a data connectivity request, and perform additional processing related thereto as will be described in further detail below.

The communication device 200 may be configured to access a network 130 via an access point 120. The access point 120 may be a Wi-Fi access point, a cellular access point, an LTE or other 3G access point, a radio access point, a wired access point (e.g., Ethernet), or other network portal. Accordingly, the network 130 may be a packet switched network, a public network, a wide-area network, a private area network, a mesh network, a cellular network, a radio network, a local area network, or other such communication network configured to transmit and receive data between devices.

The access point 120 may be configured to permit certain communication devices access to the network 130. The access point 120 may perform authorization for the communication device before allowing access to the network 130. The communication device 200 may provide information to the access point 120 which may be used to determine whether or not to allow the communication device 200 to access the network 130. The access point 120 is generally associated with a service provider such as a network operator. The service provider is the entity which determines who may access the network 130. For example, a network operator like a telecommunications company (or TelCo) may deploy radio tower access points to allow customers with a valid subscription to access a network operated by the TelCo. In such cases, the telecommunications company may wish to limit or otherwise control who can access the network 130.

FIG. 1 shows a wholesale operator server 400 in data communication with the network 130. The wholesale operator server 400 is configured to provide access on a wholesale basis. The wholesale operator server 400 may receive information regarding communication devices and/or applications which are allocated an amount of network access. Accordingly, when an application requests access via the access point 120, the access point 120 may inquire with the wholesale operator server 400 as to whether the application and/or communication device is authorized for wholesale access. In the event the application and or communication device is not authorized, the access point 120 may fall back on a standard subscription determination for the communication device 200. For example, a determination as to whether the communication device 200 has a valid subscription may be performed.

The wholesale operator server 400 is in further communication with a billing server 150. The billing server 150 is configured to receive information regarding access for the wholesale operator server 400. Where the access point 120 is operated by an entity other than the wholesale operator, the operator of the network access point 120 may request compensation for allowing the communication device 200 and/or the application 112 to access the network. The billing server 150 may be configured to facilitate this reimbursement by reconciling the usage authorized by the wholesale operator server 400 with the operator of the network access point. In some implementations, the billing server 150 may be configured to generate a billing request to a third-party such as the application developer/provider 185. The billing request may indicate an amount requested. In some implementations, the billing server 150 may be configured to generate a billing request to an account associated with the communication device 200.

FIG. 1 also includes a partner operator server 180. The partner operator server 180 generally refers to an operator who does not have a negotiated data connectivity policy for the toll-free application 112. The partner may provide toll-free access to the application 112 through an agreement (e.g., charge-back agreement) with the wholesale operator. This agreement and subsequent authorization may be achieved through messages transmitted from the partner operator server 180 and the wholesale operator server 400 via the network 130. The authorization messaging will be described in further detail below.

The system 100 shown further includes an application provider 185. The application provider 185 is an entity that provides the prepaid application. The application provider 185 may be coupled with the network 130. The application may be provided to the communication device 200 via the network 130 such as through an Internet download or an application store. In some implementations, the application provider 185 may provide the application to the wholesale operator server 400 for distribution. In the present system, the prepaid application is associated with a data connectivity policy resulting from the global wholesale data access deal between the application provider 185 and the network operator behind the wholesale operator server 400 and network 130. The application provider 185 may provide the data connectivity policy for the application through a configuration file defining the conditions to allow connectivity for the application. FIG. 1 shows an optional communication path directly from the application provider 185 to the wholesale operator server 400. Such a direct communication path may be used to provide the application to the wholesale operator along the configuration file. Alternatively, the configuration file may be provided to the communication device 200 via an Internet download or the same application store that provided the application.

Figure 2:
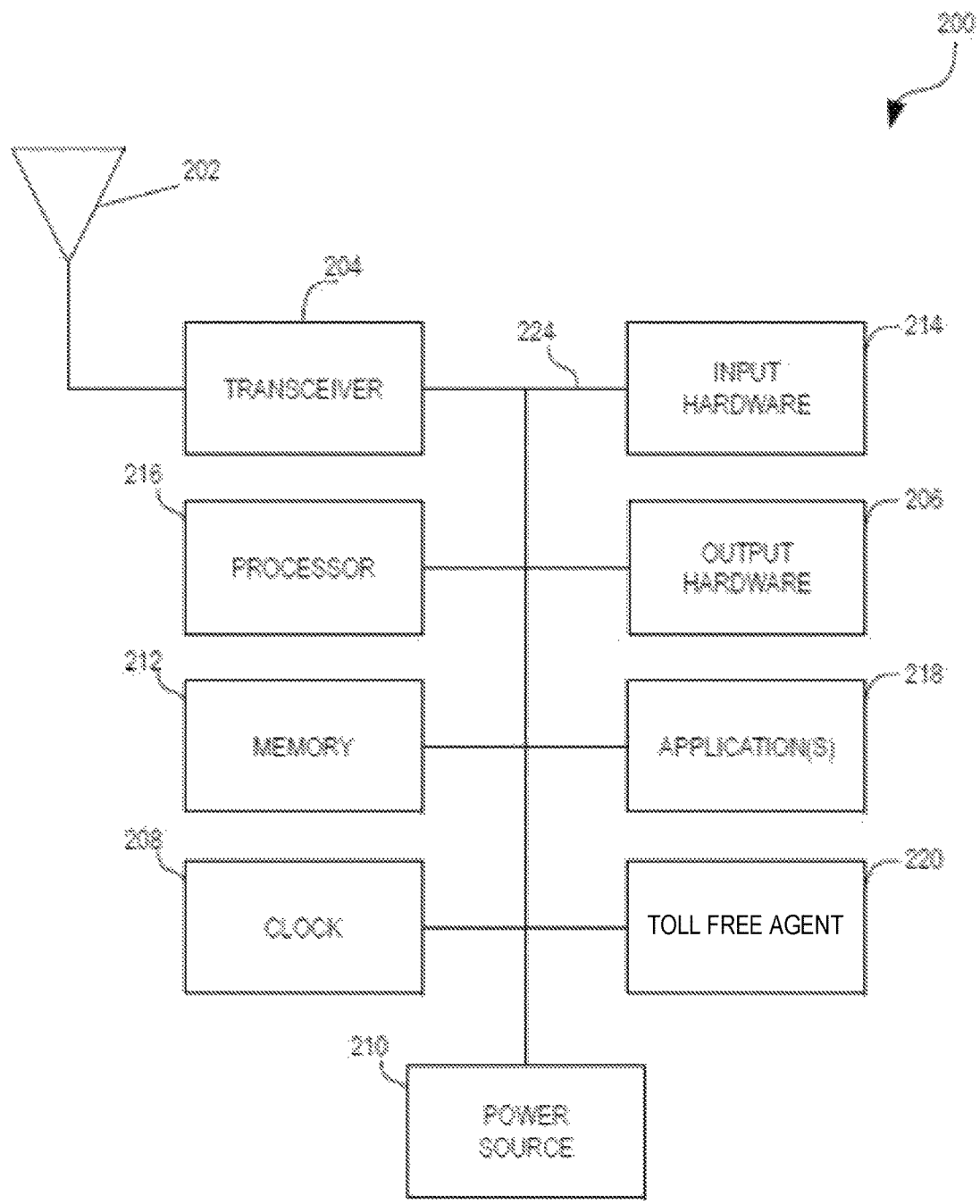
FIG. 2 is a functional block diagram of an example of a communication device.

FIG. 2 is a functional block diagram of an example of a communication device. When implemented as a device hosting a prepaid application, the communication device 200 may include circuitry for performing the main functions of a mobile phone, such as a mobile smart-phone, a tablet computer, a laptop computer, gaming console, set-top-box, personal computer, or the like.

The communication device 200 may include one or more antennas 202 and a transceiver unit 204 for the transmission and reception of wireless signals; output hardware 206 such as an audio unit, a microphone, and/or a display screen; a clock 208; a power source 210 (e.g., battery, solar panel, wired power connection); a memory 212, input hardware 214 such as a keypad or touchscreen for receiving a user input, a GPS unit for indicating the geographical location of the device, a wired network connection (e.g., Ethernet port); and a processor 216. Some output hardware 212 such as a display screen may include a touch sensitive screen. Accordingly, some output hardware 212 may provide input functionality and some input hardware 214 may provide output functionality. The memory 212 may include one or more memory circuits including non-volatile memory circuits (e.g., EEPROM, FLASH, etc.).

Depending on the capabilities of the communication device 200 and the supporting telecommunication networks the communication device 200 can also provide a range of voice and data communication services. As non-limiting examples the communication device 200 provides telephone network based communication services including voice, multimedia and text messaging, as well as other data exchange capabilities, enabling Internet access and email exchange, for example.

The communication device 200 may be configured to exchange data via a 3G or LTE network with remote servers such as a wholesale operator server and/or an application provider, and to enable data exchange enabling Internet access (e.g., data network). The communication device 200 is operable to have applications or widgets installed, such as, but not limited to social networking applications or email applications, for example, which when executed may exchange data with the remote servers. Each application or widget installed on the communication device 200 may have an associated graphical user interface.

The communication device 200 may also include one or more applications 218. The communication device 200 may further include a toll-free agent 220 enabling one or more of the applications 218 to become a prepaid application. A prepaid application 218 is distinguishable from a regular application in that it is associated to a configuration file that defines a connectivity policy (i.e. conditions to allow connectivity) for the application communications with the network 130. The toll-free agent 220, using the configuration file associated to the application, may tag a data connectivity request from the prepaid application with a first tag if that data connectivity request matches the connectivity policy of the configuration file, the tag being indicative of operator specific billing for the application.

Figure 3:
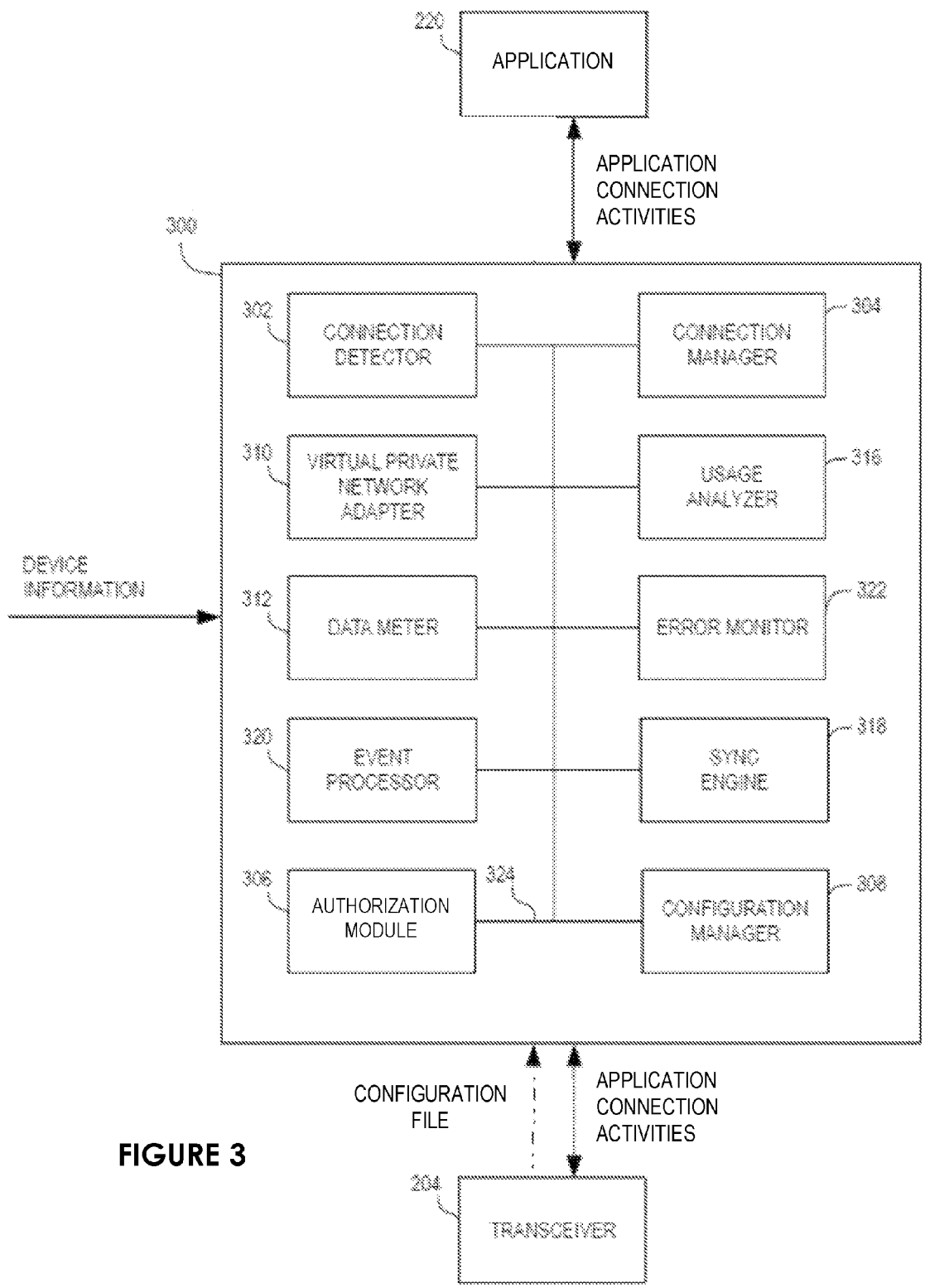
FIG. 3 is a functional block diagram of an example of a toll-free agent.

FIG. 3 is a functional block diagram of an example of a toll-free agent. The toll-free agent may be with the communication device 200 when acquired by the subscriber, or downloaded subsequently, either with the download of a first application that is eligible to toll-free, or another type of download, i.e. advertised by an application provider. The toll-free agent 300 includes a connection detector 302. The connection detector is configured to detect connection activity or request for the application 218. Connection activity may include a request for a connection, a request to transmit information via a connection, termination of a connection, reset of a connection, or other data communication connection activities.

The connection detector 302 may be configured to detect connection activity based on the application communications received from the application 218. The connection detector 302 may be configured to generate a message identifying the connection activity and transmit this information via a bus 324. The connection activity message may identify the application requesting the connection.

A connection manager 304 may obtain the message identifying the connection activity. If the message identifies a request for a new connection, the connection manager 304 may cause the initiation of the connection. Once a connection is established, the connection manager 304 may be configured to maintain the connection on behalf of the application 218.

As part of establishing a connection, the connection manager 304 may be configured to establish a toll-free connection. To do so, the connection manager 304 may check with the configuration manager 308 if a configuration file exists for the application identified from the connection activity, using for instance the connection message activity received from the connection detector 302.

A configuration manager 308 may indeed be included in the toll-free agent 300. The configuration manager 308 will manage the configuration files received for the different applications 218 present on the communication device 200. For example, the configuration manager 308 may receive application configuration file or information via the transceiver 204. The application configuration file may identify the application itself, a network address for the wholesale operator server, the tag to be included in the data connectivity request from the application 218, information regarding the data connectivity policy, i.e. conditions to allow connectivity for the application under operator specific billing, applying copy protections for the application or associated data stored for the application, enabling/disabling device features during application execution (e.g., screen shot, camera, microphone), or other parameter(s) to adjust the function of the application 218. The configuration file for an application may be received from different sources, e.g. using OTA transmission in a store (here the content provider) promoting its application available on an application store, or through deals advertised by the content provider and/or the whole sale network operator. Each configuration file received by the communication device 200 may be stored in a memory of the device (not shown in FIG. 3) in association with an entry for application 218 it is associated to.

One non-limiting advantage of the configuration manager 308 is the ability to remotely adjust the toll-free agent 300 and consequently the application 218. Such control may be useful for dynamically adjusting the operator specific billing of the application 218 without requiring a reinstallation the application.

Based on the application identified from the connection activity message, the configuration manager 308 will retrieve from the memory the corresponding configuration file. Once the configuration file is retrieved for the application 218, the connection manager 304 will verify with the authorization module 306 if the connectivity policy applies to the data connectivity request from the application 218. To do so, the authorization module 306 will access the configuration file retrieved by the configuration manager 308. Provided the data connectivity request matches the connectivity policy, i.e. the conditions of configuration file, the authorization module 306 will tag the data connectivity request with a first tag indicative of operator specific billing for the application 218. The first tag may be seen as an authorization token for a wholesale data connection and will indicate the authorization status for the connection. In an additional embodiment of the present system, the added first tag may be further accompanied with an application and/or an operator identifier for the wholesale operator (server).

The authorization module 306 may indicate a wholesale connection is not available by leaving the data connectivity request unchanged. Indeed provided the conditions from the configuration file are not matched, the data connectivity request may be handled like a regular connectivity request that is billed according to the user regular data plan. Once the authorization module 306 has checked the data connectivity request against the connectivity policy for the application 218, the connection manager 304 will establish a connection for the application using the tagged or untagged connectivity request. Once the connection resulting from the tagged data connectivity request is established, it becomes an authorized toll-free connection as described here after. One may note that if no configuration file is retrieved, the application 218 making the data connectivity request is not eligible for a toll-free connection. Consequently, the connection manager 304 may not need to activate the authorization module 306 and will leave the data connectivity request unchanged as well.

The toll-free agent 300 may also include a virtual private network adapter 310. The virtual private network adapter 310 may be included to provide secure communication between the application 218 and the network 130. Upon establishing a connection, the virtual private network adapter 310 may be used for application communications. The virtual private network adapter 310 may be used only for authentication. In some implementations, it may be desirable to use the virtual private network adapter 310 for application data communications as well. For example, if the application is a banking application, the application developer may determine that certain transactions utilize the virtual private network adapter 310.

As information flows through the established connection, a data meter 312 is configured to monitor information for the authorized (toll-free) data connection. The data meter may monitor such information for each application eligible to a toll-free connection, i.e. each application 218 associated to a configuration file in the (memory of the) communication device 200. Information which may be collected includes a data transmission amount, a data received amount, a data connection duration, a destination of data transmitted, a source of data received, one or more data request messages, one or more data response messages, and a time at which the toll-free data connection was established. That time corresponds to the time the connection subsequent to the tagged data connectivity request is established. The data meter 312 may also time stamp each element of information to identify when the metered value was collected. The data meter 312 may further track the duration of the established toll-free data connection.

A usage analyzer 316 may be configured to process the information collected by the data meter 312. Such processing may include calculating usage information for an authorized data connection. The usage analyzer 316 may also be configured to compare the usage information with the data connectivity policy, for instance when the data connectivity policy comprises a duration of connection or a maximum quantity of toll-free bytes. Say the number of bytes of data for the application 218 exceeds a quantity specified in the data connectivity policy, the usage analyzer may generate a message indicating the policy amounts have been exceeded. The usage analyzer may be further configured to issue an alert message when the number of bytes or duration of usage exceeds a preset percentage of the maximum quantities defined in the data connectivity policy. The usage analyzer 316 may be further configured to collect application specific analytics such as the time spent on given location within the application, buttons pressed, application performance, and the like. In some implementations, the application configuration may specify the aspects to analyze.

This message may be received by an event processor 320. The event processor 320 may be configured to instruct the toll-free agent 300 to take one or more actions based on the received event. Events may include usage events, such as exceeding the authorized data connectivity policy. Events may include device events such as powering down, low battery, incoming phone call, termination of a phone call, initialization of an application, termination of an application, device locking, device unlocking, and the like. An example of an action may be for the connection manager 304 to terminate a connection upon detection of exceeding the authorized data connectivity policy. In some implementations, the event processor 320 may be configured to transmit event information to a third-party. For example, an application to keep track of where a child's smartphone is located may detect movement into an area of interest (e.g., into a 'restricted' area, at a specific time, etc.). This event may cause the transmission of a text message or email message to another device (e.g., the parent's smartphone) in addition to transmitting information to an application provider. In the case of an email message, because the application may eligible to toll-free access through a configuration file, the application may be allowed data connectivity to send this potentially life-saving message.

Another example of an action may be to transmit a report of the usage analyzer 316. A sync engine 318 may be configured to provide such an update of usage information for the application 218. The sync engine 318 may obtain the usage information from the usage analyzer 316, prepare the information for transmission, and send the usage transmission. The sync engine 318 may be configured to transmit such usage information based on an event, and or the periodic schedule. For example, the sync engine 318 may be configured to transmit a report of usage every five minutes. The usage report may include the first tag, i.e. the authorization token, an application identifier, an operator identifier, and a device identifier.

An error monitor 322 is included to detect errors raised by the application 218 and or the toll-free agent 300. The error monitor 322 may generate an error report. This error report may be transmitted to the wholesale server operator via the sync engine 318. The error report may include the authorization token, an application identifier, and operator identifier, a device identifier, and information related to the error raised.

The toll-free agent 300 shown in FIG. 3 receives device information. The device information may include one of power or network bandwidth available to the device, a location identifier indicating a geospatial location of the device, a device identifier uniquely identifying the device, and a user identifier. Examples of device information include a device operating system identifier, an operating system version, and device events and/or errors. The device information is made available to the elements of the toll-free agent 300 for further processing. For example, the sync engine 318 may be configured to defer transmitting usage reports when device resources are limited (e.g., low bandwidth, low power).

The bus 324 may couple the above described elements for the toll-free agent 300. The bus 324 may be a data bus, communication bus, or other bus mechanism to enable the various components of the toll-free agent 300 to exchange information. It will further be appreciated that while different elements have been shown, multiple elements may be combined into a single element, such as the data meter 312 and the event processor 320.

The present toll-free agent 300 enables a regular application to become prepaid provided it receives a configuration file for that application. The configuration file comprises a connectivity policy under which a data connectivity request from that application will allow operator specific billing. This will be referred to as the prepaid or toll-free mode here after. This is allowed through the authorization token mentioned here above. When the connectivity policy is not matched, or not present, any connectivity request from that application will be handled like a regular connectivity request, billed under the user regular data plan (referred to as the regular mode). Thanks to the present agent, no modification is required for the application to change its billing management. Furthermore, thanks to the present toll-free agent, any application, provided a configuration file is available, may become toll-free, transparently to the user.

Figure 4:
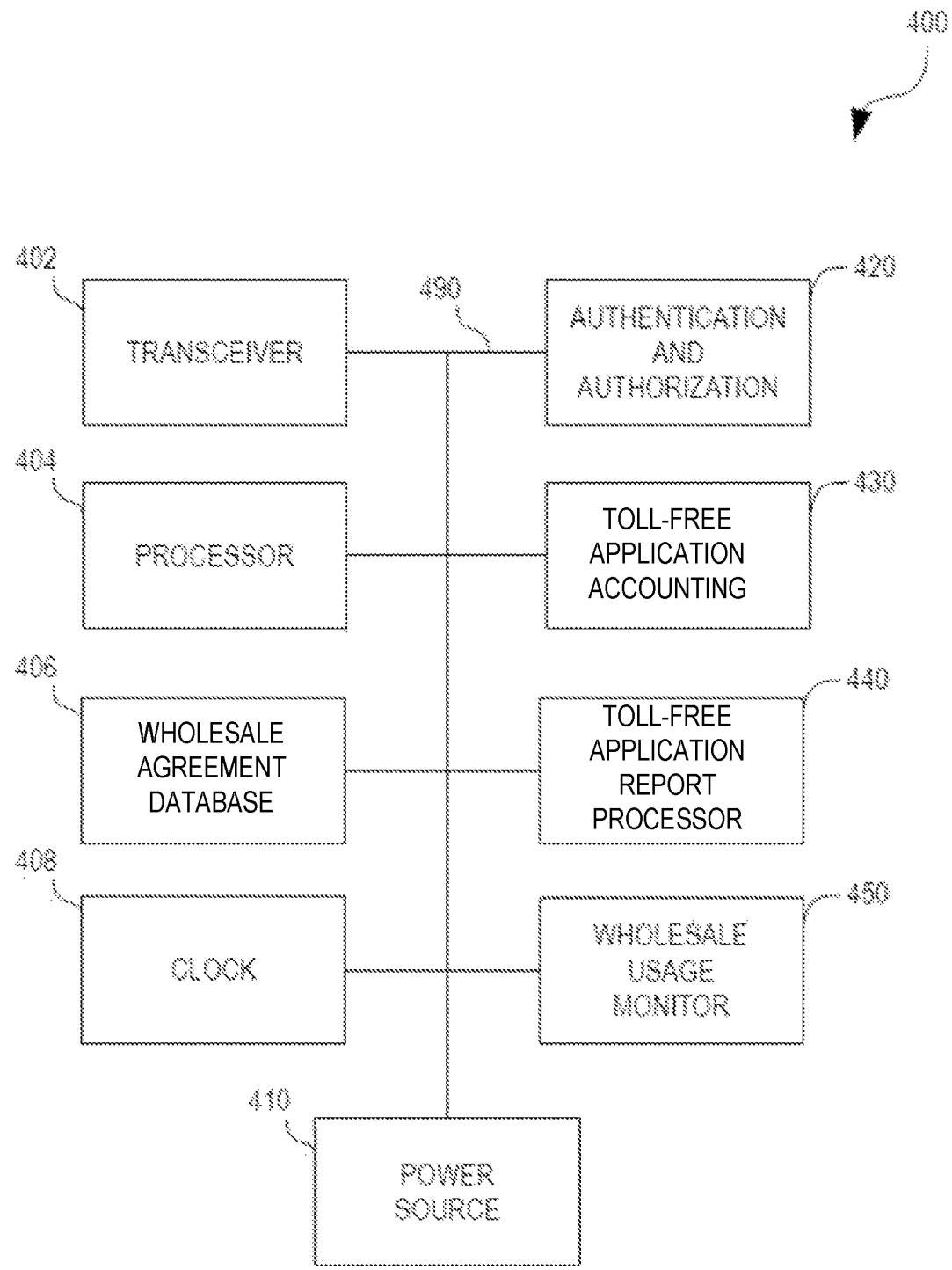
FIG. 4 is a functional block diagram of an example wholesale server.

FIG. 4 is a functional block diagram of an example wholesale server. The wholesale server 400 is configured to manage the provisioning of wholesale data access (e.g., toll-free or subsidized access) for prepaid applications, like application 218. The management may include receiving configuration files for the application connectivity policy, providing conditions to allow connectivity for the application under operator specific billing, such as toll-free or subsidized connectivity, and, when the application is made available through partner operator networks, providing an authorization interface and reconciliation interface for the partner operators. Alternatively, the configuration file for an application may be received through over channels as mentioned before.

The wholesale server 400 may include one or more antennas (not shown) and a transceiver 402 for the transmission and reception of wireless signals; a processor 404; a memory 406; a clock 408; and a power source 410 (e.g., battery, solar panel, wired power connection). In some implementations, the wholesale server 400 includes a wired network connection (e.g., Ethernet port, fiber optic data port).

The wholesale server 400 includes an authentication and authorization circuit 420. The authentication and authorization circuit 420 is configured to receive wholesale authorization requests and generate an appropriate response. The authentication and authorization circuit 420 may be configured to parse the information upon which the authorization determination will be made. For instance, the authentication and authorization circuit 420 may search for an authorization token in the data connectivity request received from the communication device 200. The authentication and authorization circuit 420 may then compare the token included in the data connectivity request with information included in the wholesale agreement database 406. For example, if the authorization token may correspond in database 406 to operator specific billing for the application and/or the third party company, i.e. the application provider. The comparison may be further based on the application identifier and/or the operator identifier. The whole sale agreement database 406 may be updated each time a deal, i.e. a wholesale agreement, is reached between a third party company (the application provider 185) providing the application 218 and the wholesale network operator. Information available on database 406 may comprise an entry for each new deal, each entry comprising e.g. the configuration files for the application(s) that can become prepaid through the deal, the related data connectivity policy, the authorization token that will be used by the toll-free agent 300, the application identifier(s) . . . .

More generally, the configuration file for an application 218 in the present system may comprise some or all of the data connectivity policy, an operator identifier and/or address for the wholesale network server, an identifier for the application itself, and an identifier for the subscriber to the network like SuperTelco. The data connectivity policy may include at least one of a data transmission amount, a received data amount, a data connection duration, a proximity to a given location, a policy expiration time . . . . The data connectivity policy may also include other events like the hand over to a free WiFi network, that terminates at least temporarily the need for the toll-free mode for the application 218. The configuration file may also define one or more authorized content sources for the application. A content source may be defined through its address or an identifier.

The wholesale server 400 shown in FIG. 4 includes a toll-free application accounting circuit 430. The toll-free application accounting circuit 430 is configured to reconcile usage for the toll-free applications. For example, the application accounting circuit 430 may be configured to periodically (e.g., daily, weekly, hourly, monthly) communicate with the billing server 150 of FIG. 1. The application accounting circuit 430 may transmit indicators to exclude the toll-free application data usage from individual subscriber's bills. The application accounting circuit 430 may be further configured to reconcile usage fees associated to the toll-free application incurred via partner operators. In this situation, the application accounting circuit 430 may receive a request for toll-free application data provided via the partner operator and generate a response. The response may include an automatic clearing transaction identifier associated with a funds transfer to the partner operator. The response may include additional status information such as disputed amounts, discrepancy amounts, and the like. The application and accounting circuit 430 may further generate billing information for the application provider 185. For example, if the application provider has agreed to pay a fixed amount per toll-free application deployed (through the deployment of the configuration files), the application and accounting circuit 430 may collect this information, such as from the memory 406, and generate an appropriate billing request (e.g., via the billing server) for transmission to the application provider 185.

The wholesale server 400 shown in FIG. 4 includes a toll-free application report processor 440. The toll-free application report processor 440 is configured to generate reports illustrating aspects of a toll-free application. The reports may be summary reports such as total number of users or total quantity of data utilized. The reports may include aggregations such as by date/time, by device type, by user, by device, by location, by network used for data access, by application version number, and the like.

The toll-free application report processor 440 reports may be based on the information collected by a wholesale usage monitor 450. The wholesale usage monitor 450 is configured to receive the usage information from a toll-free application, received from the synch engine 318 mentioned sooner in relation to the toll-free agent 300. The wholesale usage monitor 450 may store the received information in the memory 406.

When an application requires data connectivity, several scenarios may arise. In one scenario, the application provider 185 has negotiated data access with a wholesale operator (seen here through the wholesale operator server 400) who is also the operator of the network the device executing the application is attached, e.g. a subscriber of. In this scenario, the network operator (i.e. the network operator server) has direct access to the wholesale operator server 400. In a second scenario, the application provider 185 has negotiated data access with the wholesale operator. However the application/device may be attached to a network operated by another network operator. In some implementations, this may be referred to as roaming. In this second scenario, the application may be considered roaming when attempting to access a data network through a connection operated by someone other than the wholesale operator. The message flow diagrams below provide example message flows for establishing a connection and communicating application data in the example scenarios discussed above.

Figure 5:
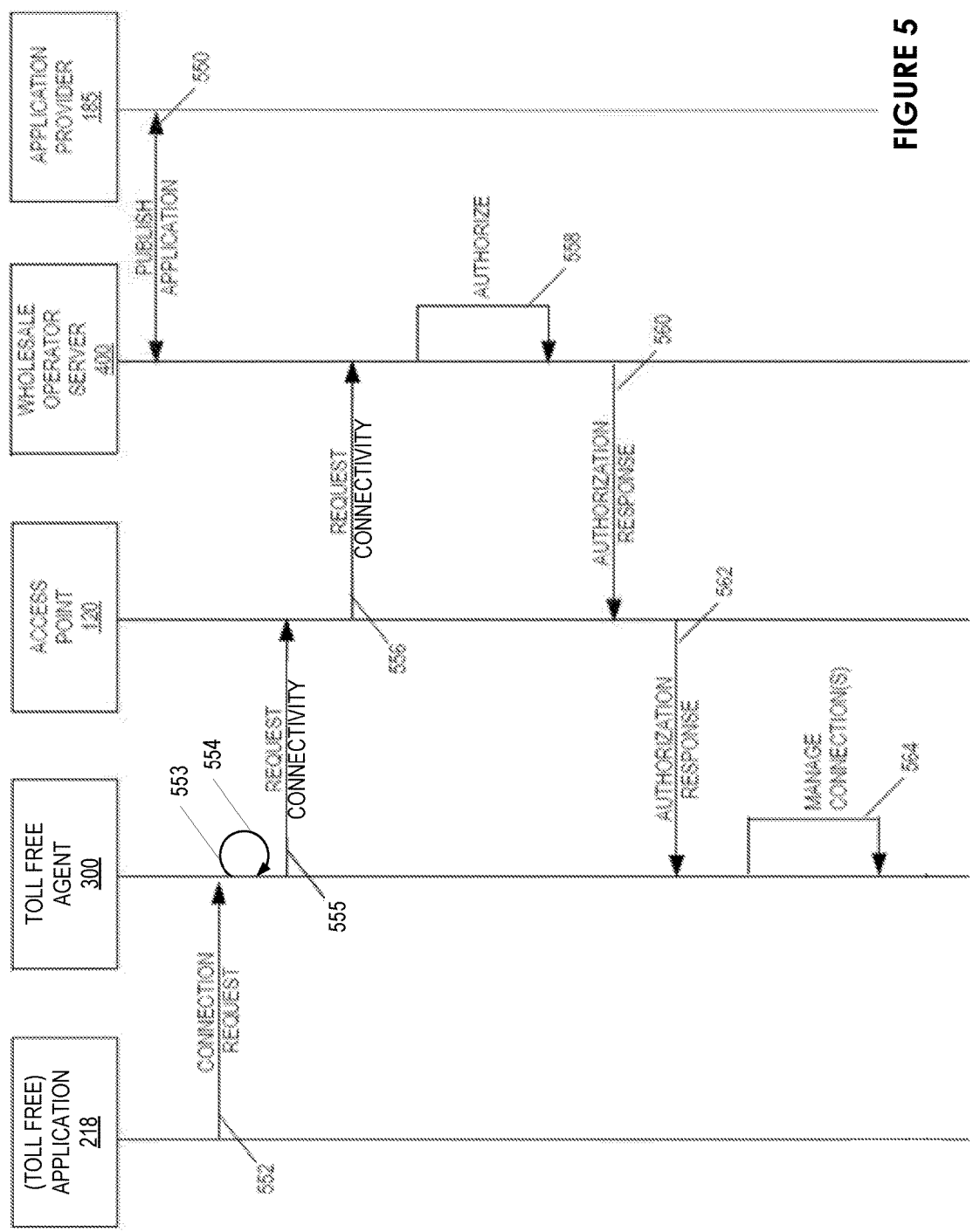
FIG. 5 is a message diagram for obtaining a wholesale data connection.

FIG. 5 is a message diagram for obtaining a wholesale data connection. The message flow of FIG. 5 shows messages exchanged between several entities which may be included in a communication system. For ease of explanation, the number of entities shown has been limited. However, it will be understood that additional entities may be added or multiple entities combined consistent with the description herein. The message flow of FIG. 5 illustrates obtaining a wholesale data connection via a network which is controlled by the wholesale operator. One may note that reference is made to a "prepaid" or "toll-free" application in the present description, including FIGS. 5 and 6. Applications in this present system are not altered, for instance through the addition of a wrapper, as in co-pending application U.S. 61/840,082 from the same applicant. It is the data connectivity requests, and more generally the data activities from an application that are modified through the toll-free agent thanks to the application configuration file, if available. As mentioned before, the simple use of such a configuration file allows the present system to modify the way application data connectivity is billed to a user.

Messaging 550 between the application provider 185 and the wholesale operator server 400 may be performed to publish the application 218 through the wholesale operator. In one implementation, the application provider 185 may generate a binary application. The application may then be uploaded to the wholesale operator server 400 such as via HTTP, HTTPS, FTP, or other communication protocol. Alternatively, the application 218 may be published through other means, such as e.g. an application store, a website, or other distribution location/mechanism.

As part of the messaging 550, the application provider 185 may also specify a wholesale agreement with the wholesale operator server 400, that is subsequently stored in the wholesale agreement database 406 mentioned earlier. For example a news application provider may negotiate 10 MB of use per user per day for an application to be provided by the wholesale operator server 400. The wholesale agreement may include for instance the configuration file, the authorization token (i.e. the first tag for tagging any application data connectivity request matching the conditions of the configuration file), the data connectivity policy . . . .

The prepaid application 218 may transmit a connection (or data connectivity) request via message or act 552 that is detected by the toll-free agent 300, through its connection detector 302. The toll-free agent 300 will then retrieve the configuration file for the application identified from the message 552 in a further act 553, using its configuration manager 308. The toll-free agent 300, using e.g. the authorization module 306, will, in a further act 554, tag the data connectivity request with the authorization token, if the data connectivity request matches the conditions of the configuration file, the authorization token being indicative of operator specific billing for the application. The operator specific billing corresponds to the wholesale agreement that will be applied when billing the data activity of the prepaid application 218 to the user. The toll-free agent, namely its connection manager 304, may then transmit a tagged data connectivity request through message 555 via the access point 120 to the wholesale operator server 400 for implementing the operator specific billing for the application data connections, i.e. consumptions. The authorization token may further include an application identifier and an identifier for the wholesale operator. In some implementations the authorization token may further include additional information such as a device identifier, a location identifier, or a user identifier indicative of a user of the application.

The access point 120 may identify the authorization token as a wholesale authorization request. The identification may be based on the token itself, as known from the wholesale agreement database 406, the application identifier and/or the identifier for the wholesale operator. In some implementations, the data connectivity request message 555 may be of a distinguishable type. In such implementations, the message type may indicate the destination of the authorization request. The access point 120 may be configured to allow such traffic to pass through to the wholesale operator server 400. In some implementations, the access point 120 may track such requests and include the bandwidth used for further reimbursement from the wholesale operator.

The access point 120 may transmit a message/act 556 to the wholesale operator server 400 including the data connectivity request. The wholesale operator server 400 via message 558 may further perform another authorization, through comparison of the received authorization token to the entry in the wholesale agreement database 406, corresponding to the additional data in the data connectivity request messages 555/556. The authorization may be based on the information included in the authorization request. For example, if the application is executed on a device located within a retail location, wholesale access may be granted free of charge to the device. However if the device travels outside the retail location, limited wholesale access may be granted. The limit may be based on quantity of data, time of day, proximity to the retail location, or other factor. Using the retail location example, the configuration file may further include a location condition to verify if the device location (based on location sensors for instance) is within a giving distance of the know retail store location. Other location may include a period of time, during which, for instance, discounts are available within the store.

In an optional act 560, the wholesale operator server 400 may sent to the access point 120 an authorization/confirmation message 560 that includes response confirmation of the prepaid access based on the wholesale agreement and the corresponding data connectivity policy. The authorization message 560 may include a rejection of further toll-free connections from the application, for instance if the wholesale agreement has been cancelled. The authorization message may further include an update to the data connectivity policy through an updated configuration file if the wholesale agreement has changed.

The access point 120 may transmit the authorization response via message 562 to the toll-free agent 300. Based on the authorization response 562, the toll-free agent 300 via message 564 may manage the further connections. Managing the connections may include establishing the connection, closing the connection, resetting a connection, or the like, transparently to the application 218. In some implementations, the connection manager 304 may be configured to manage the connections. If authorized, the connection response may include an indication that a wholesale data connection has been established. The toll-free agent 300 may tag again any further data activity from the application, provided the conditions of the configuration file are still met, e.g. the maximum data connectivity allowed has not been reached (as measure through the data meter) or if the location is still proximate to the retail store providing the application (retail store location embodiment). Actually any further data activity may be seen as another data connectivity request.

Having established a wholesale data connection, the application 218 may begin using the connection to send and receive data, based on the operator specific billing conditions, defined in the wholesale agreement, hence becoming toll-free or prepaid to the user. This specific operation of the prepaid application is described in FIG. 6 here after.

Figure 6:
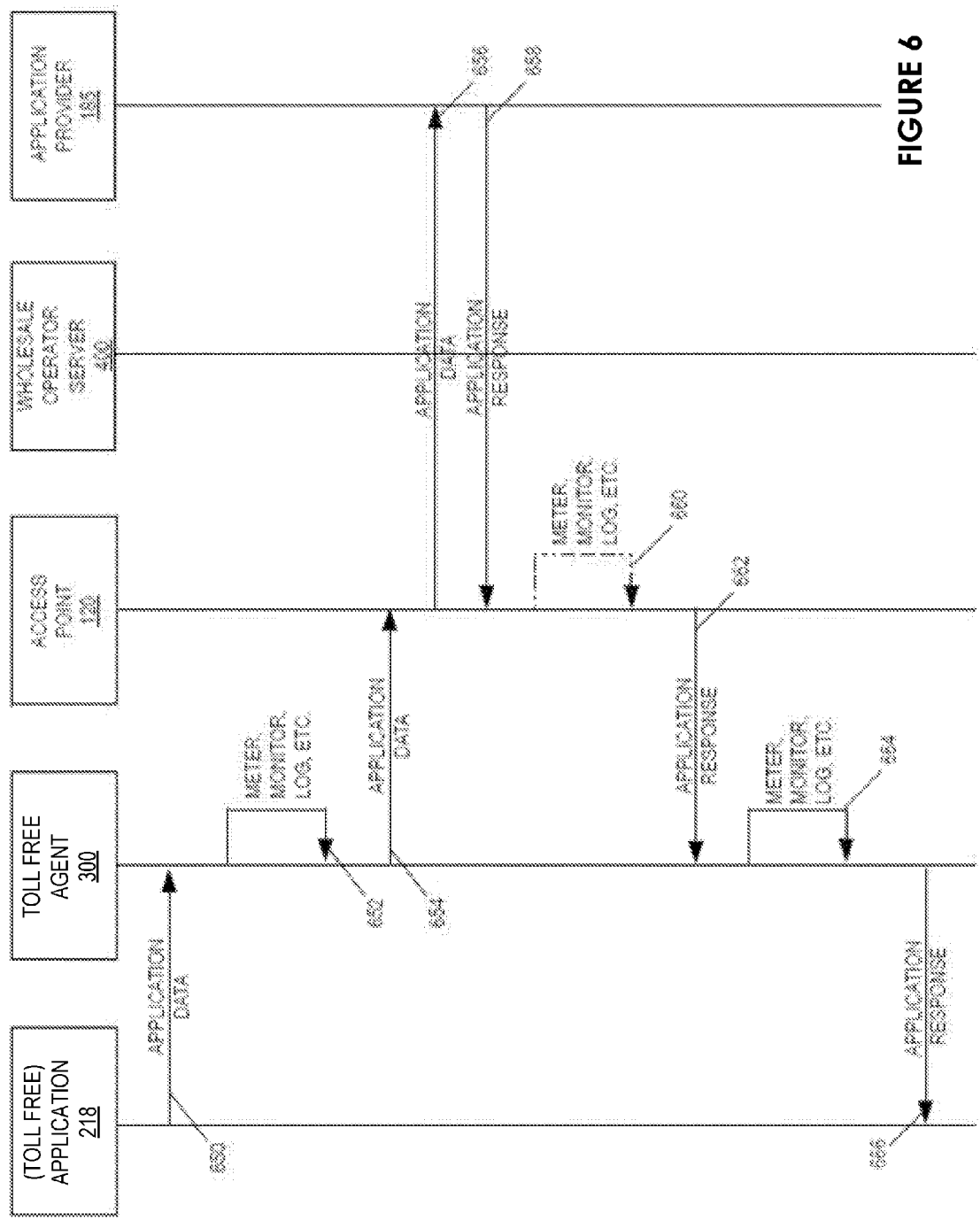
FIG. 6 is a message diagram for communicating data via a wholesale data connection.

FIG. 6 is a message diagram for communicating data via a wholesale data connection. The message flow of FIG. 6 shows messages exchanged between several entities which may be included in a communication system. For ease of explanation, the number of entities shown has been limited. However, it will be understood that additional entities may be added or multiple entities combined consistent with the description herein. The message flow of FIG. 6 illustrates application communication via a wholesale data connection through a network which is controlled by the wholesale operator.

A message 650 may include application data, i.e. a data activity. The message 650 may be transmitted from the prepaid application 218 to the toll-free agent 300, again using the connection detector 302.

The toll-free agent 300 via message 652 may monitor, meter, log, or otherwise process the application data, for instance using data meter 312. Presuming the application data does not violate the data connection policy, as checked by the authorization module 306 using the conditions of the configuration file, message 654 is transmitted from the toll-free agent 300 to the access point 120 including the application data. The application data may include the authorization token to identify the prior connectivity permission granted to the application/device. The access point 120 may transmit the application data directly to the application provider 185 via message 656. In some implementations, the application data may be transmitted to another service provider (not shown, when the service provider for the application data is different than the application provider 185). For example, the application may access content (e.g., multimedia, images, text) hosted by a third-party.

Message 658 includes an application response. The application response shown in FIG. 6 is transmitted from the application provider 185 (or a distinct service provider) to the access point 120.

Some access points may be aware that the connection is a wholesale data connection. For example if the access point 120 is maintained by the wholesale operator, the access point 120 may optionally meter, monitor, log, or otherwise process the application response. This is shown in FIG. 6 as optional message 660. Such messaging may be useful to further exercise data connectivity policy control, e.g. verify if the authorization token has not expired. Consider the situation where an application is allocated 100 MB of data. In an extreme case, where an application response exceeds 100 MB of data, the access point 120 may be configured to terminate the connection. In a less extreme case, it may be determined that an average response for the application is 5 MB. If a response is received for a connection which has already logged 97 MB of usage, the access point 120 may be configured to terminate the connection. Such a situation may happen when the application data received in response to a pending data activity is larger than the amount left according to the data connectivity request. As the toll-free agent may not anticipate the size of the response, the access point 120, or the wholesale operator server 400 itself, may act as a backup for terminating the toll-free data activity.

Assuming the access point 120 is not exercising control or otherwise terminating the connection, the application response is transmitted via a message 662 from the access point 120 to the toll-free agent 300, either directly or indirectly (using the connection detector 302). The toll-free agent 300 at message 664 will again meter, monitor, log, or otherwise process the application response data, using the data meter 302. This may include counting the number of bytes received, identifying the content received, logging any errors obtained, and the like.

If the toll-free agent 300 determines the authorized data policy has not been exceeded, message 666 includes the application response and is transmitted from the toll-free agent 300 to the application 218. In the event the data policy has been exceeded, the toll-free agent 300 may be configured to transmit a message indicating such a state to the application. In this case, the toll-free agent 300 may also terminate the connection.

Not shown in FIG. 6 is the periodic reporting of the usage data to the wholesale operator server 400. The report may include an identification of the application, data monitored or logged, errors, wrapped application configuration (e.g., settings, version number), or other information related to the toll-free application 218. One may note that the authorization token may be renewed regularly as long as the data connectivity policy is still valid for a toll-free connection.

Figure 7:
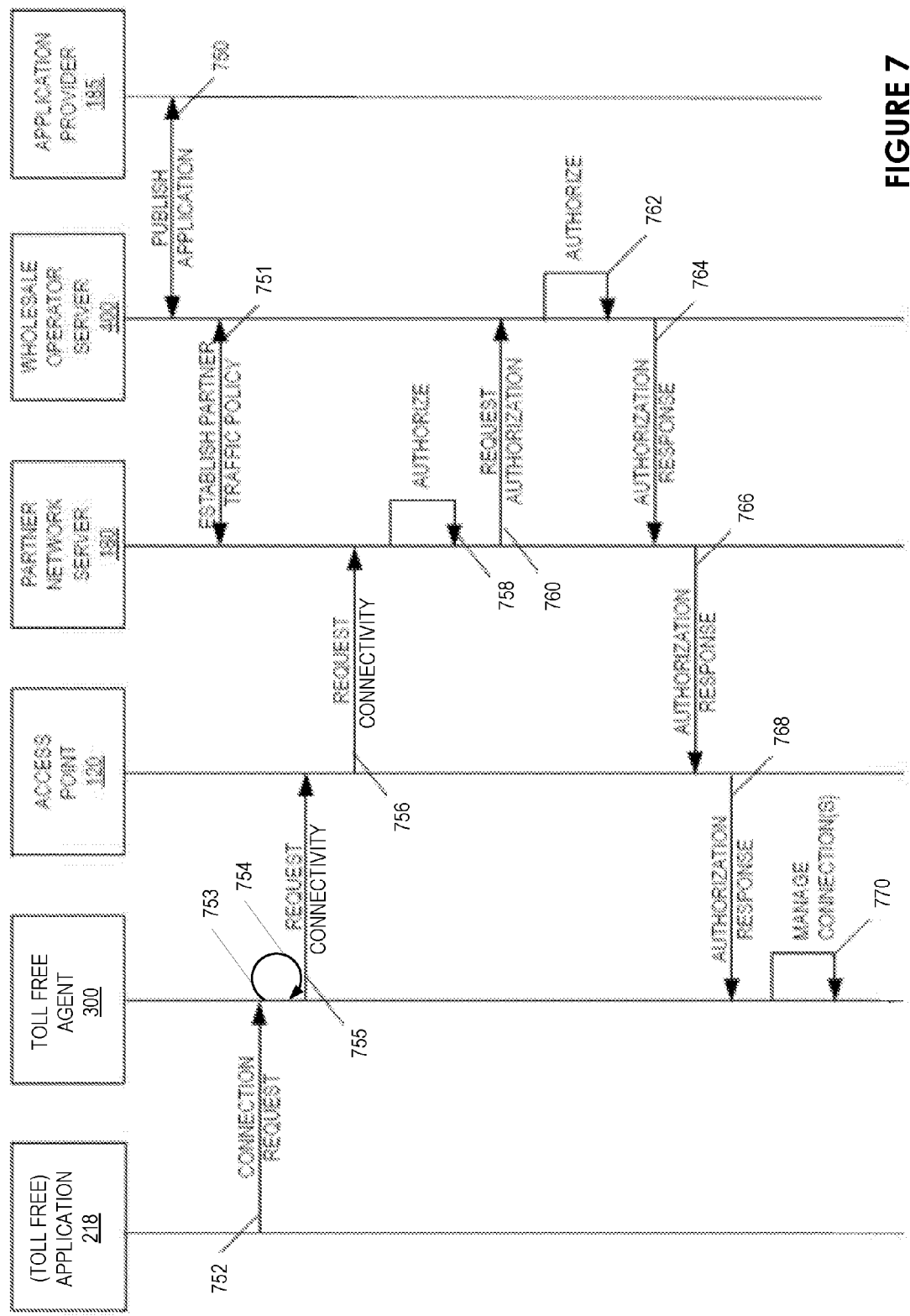
FIG. 7 is a message diagram for obtaining a wholesale data connection from a partner network.

FIG. 7 is a message diagram for obtaining a wholesale data connection from a partner network. The message flow of FIG. 7 shows messages exchanged between several entities which may be included in a communication system. For ease of explanation, the number of entities shown has been limited. However, it will be understood that additional entities may be added or multiple entities combined consistent with the description herein. The message flow of FIG. 7 illustrates obtaining a wholesale data connection via a network which is controlled by a partner operator who is different than the wholesale operator.

Messaging 750 between the application provider 185 and the wholesale operator server 400 may be performed to publish the application, as mentioned in relation to FIG. 5. In one implementation, the application provider 185 may generate a binary application. The application may then be uploaded to the wholesale operator server 400 such as via HTTP, HTTPS, FTP, or other communication protocol. What was described in relation to message 550 (publication of the application, the wholesale agreement stored in database 406 . . . ) in FIG. 5 may be applied to the message 750 here.

One or more messages 751 may be exchanged between the wholesale operator server 400 and the partner network server 180 to establish a partner traffic policy. The partner traffic policy provides criteria to the partner network server 180 to indicate that application traffic for a prepaid application 218 should be permitted without additional subscription. For example the partner traffic policy may include a wholesale operator identifier and an application identifier. These two elements may be used to identify prepaid application communications and provide a zero rating (operator specific billing according to the wholesale agreement between the wholesale network and the application provider) for data connections for the identified application and operator through the partner network server 180.

The description for messages/steps 552, 553, 554, 555 and 556 of FIG. 5 may be applied respectively to the messages 751, 752, 753, 754 and 756 of FIG. 7. The toll-free agent 300 may transmit a tagged data connectivity request through message 755 via the access point 120 to the partner network server 180, the message including the authorization token for wholesale access for the application 218. This authorization token may further include an application identifier and an identifier for the wholesale operator server 400. In some implementations the authorization token may include additional information such as a device identifier, a location identifier, or a user identifier indicative of a user of the application. The access point 120 may further transmit the tagged data connectivity request via message 756 to the partner network server 180.

The partner network server 180 via message 760 may attempt to authorize the application and/or device. For example, the partner network server 180 may determine a particular device is included on a blacklist based on the information included in the tagged data connectivity request and therefore will not authorize the device/application to access their network. The authorization may also include authorizing based on previously obtained authorization information from the wholesale operator server 400. In such an implementation, the partner network server 180 may be configured to store data connectivity policy information for specific application and wholesale operator, for instance received from the wholesale agreement database 406. The partner may use the stored data connectivity policy information to authorize the connection for the application. One may note that the partner network server 180 may decline the connectivity request if the wholesale agreement does not extend for instance to roaming situations.

In the message flow shown in FIG. 7, the partner network server 180 via message(s) 758 may perform the initial authorization (e.g., determine the request is not black-listed) to determine the request is authorized for limited purpose of communicating with the wholesale operator server 400. As shown however, the partner network server 180 may transmit a message 760 to the wholesale operator server 400 including the data connectivity request. The connectivity request may be the same as transmitted via message 756. In some implementations, the authorization request included in the message 760 may include additional information such as an identifier of the partner network server 180.

The wholesale operator server 400 via message 762 may perform further authorization as in act/message 558 of FIG. 5. For instance, the authorization may be based on the comparison of the received authorization token to the entry in the wholesale agreement database 406, corresponding to the additional data in the data connectivity request message 755/756. The authorization may also be based on the information included in the connectivity request 756 received from the partner network server 180. For example, if the application is executed on a device is located within a retail location, wholesale access may be granted free of charge to the device/application. However if the device travels outside the retail location, limited wholesale access may be granted. The limit may be based on quantity of data, time of day, or other factor. The authorization may also consider the partner network server 180 through which the request was sent. For example, the wholesale agreement between the wholesale operator and the application provider 185 may be a value based agreement (e.g., $5.00 of service per user per day). In such an implementation, the cost of access may differ between partners. The partner network identifier may be used to identify a cost basis for access which may be included in the authorization determination.

FIG. 7 shows a message 764 sent from the wholesale operator provider to the partner network server 180 including the authorization response, i.e. a response confirmation of the prepaid access based on the wholesale agreement and the corresponding data connectivity policy. The authorization response 764 may include a rejection of further toll-free access to the application, if the wholesale agreement does not include the partner network 180 as part of the wholesale agreement for instance. The authorization response may be no wholesale access, partial access, or full access. The authorization response may also include an update to the data connectivity policy as discussed above. The authorization response may include data connectivity policy cache information. The data connectivity policy cache information may indicate whether the data connectivity policy information for the specified application may be cached by the partner network server 180 and, if so, how long. This cached information may be used for subsequent authorization such as message 758 discussed above.

A message 766 sent from the partner network server 180 to the access point 120 includes an authorization response. In some implementations, the authorization response included in message 766 may be the same as the authorization response received in message 764 from the wholesale operator server 400. In some implementations, the authorization response is generated based on the authorization response received in message 764 from the wholesale operator server 400.

The access point 120 may transmit the authorization response via message 768 to the toll-free agent 300. Based on the authorization response, the toll-free agent 300 via message 770 may manage the subsequent connections. Managing the connections may include establishing the connection, closing the connection, resetting a connection, or the like. In some implementations, the connection manager 304 may be configured to manage the connections. If authorized, the connection response may include an indication that a wholesale data connection has been established. The toll-free agent 300 may tag again any further data activity from the application, provided the conditions of the configuration file are still met, e.g. the maximum data connectivity allowed has not been reached (as measure through the data meter) or if the location is still proximate to the retail store providing the application (retail store location embodiment). Actually any further data activity may be seen as another data connectivity request.

Having established a wholesale data connection through the partner operator, the toll-free application 218 may begin using the partner operated connection to send and receive data, toll-free based on the data connectivity policy (of the wholesale agreement), transparently to the user. This specific operation of the prepaid application is described in FIG. 8 here after.

Figure 8:
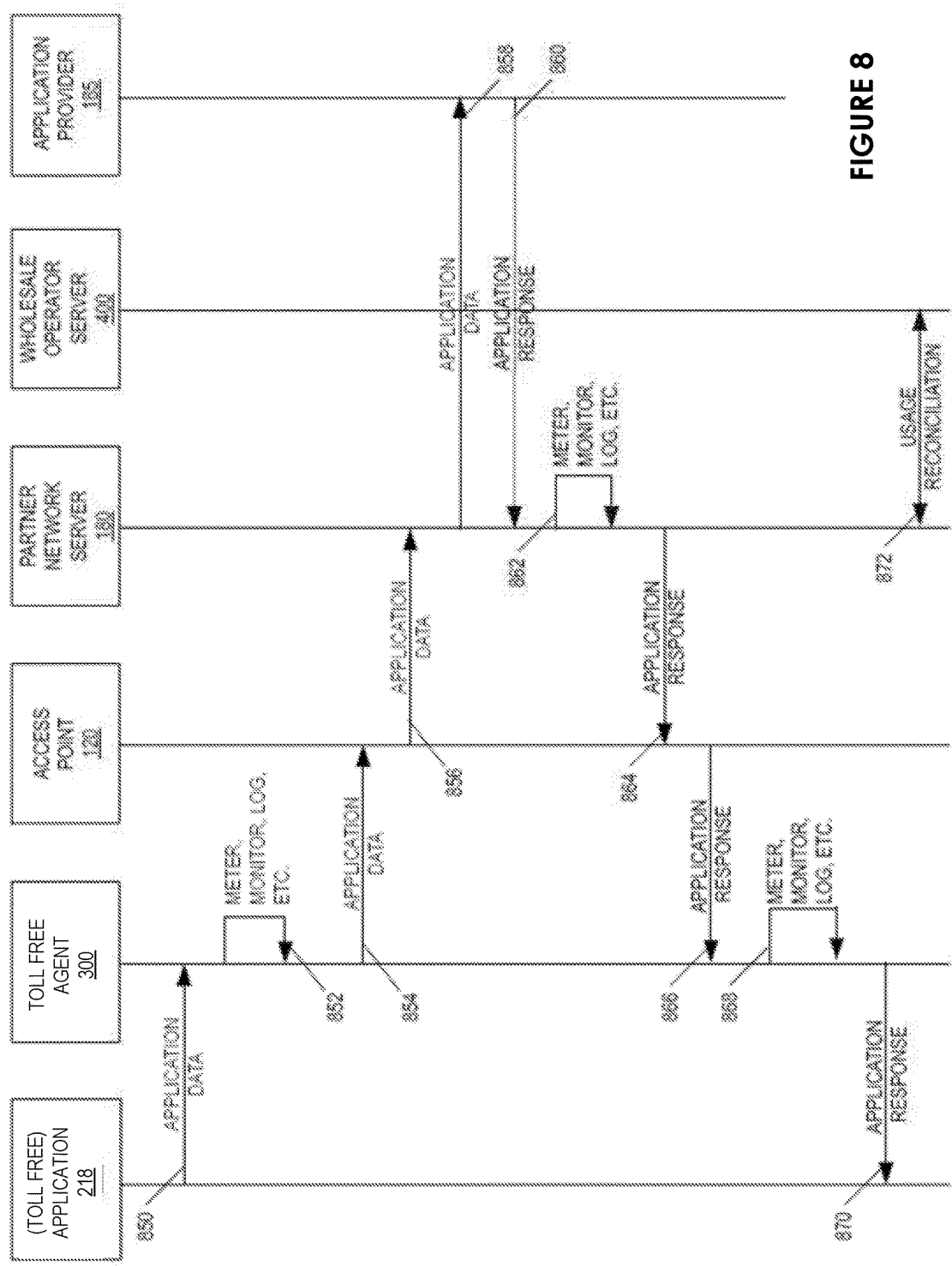
FIG. 8 is a message diagram for transmitting data via a wholesale data connection from a partner network.

FIG. 8 is a message diagram for transmitting data via a wholesale data connection from a partner network. The message flow of FIG. 8 shows messages exchanged between several entities which may be included in a communication system. For ease of explanation, the number of entities shown has been limited. However, it will be understood that additional entities may be added or multiple entities combined consistent with the description herein. The message flow of FIG. 8 illustrates application communication via a wholesale data connection through a network which is not controlled by the wholesale operator (e.g., a partner operator).

A message 850 may include application data, i.e. data activity. The message 850 may be transmitted from the toll-free application 220 to the toll-free 300, using the connection detector 302.

The toll-free agent 300 via message 852 may monitor, meter, log, or otherwise process the application data, e.g. using the data meter 312. Presuming the application data does not violate the data connection policy, as checked by the authorization module 306 using the conditions of the configuration file, message 854 is transmitted from the toll-free agent 300 to the access point 120 including the application data. The access point 120 is configured to transmit the application data to the partner network server 180 via message 856. The application data may include the authorization token to identify the prior connectivity permission granted to the application/device. A validation of the authorization token included in the application data may be performed by the partner operator. If the token is valid (e.g., associated with a previously authorized connection; not expired; etc.), the transmission may be permitted. If the token is not recognized or is expired, the authorization shown in FIG. 7 may be repeated to obtain a new authorization token.

In the case where the application data is authorized, the partner operator transmits the application data to the application provider 185 via message 858. In some implementations, the application data may be transmitted to another service provider (not shown). For example, the application may access content (e.g., multimedia, images, text) hosted by a third-party.

Message 860 includes an application response. The application response shown in FIG. 8 is transmitted from the application provider 185 to the partner operator server 180. The partner operator server 180, at message 862, meters, monitors, logs or otherwise processes the application data and/or response. The partner operator server 180 may seek reimbursement for the data transmitted for the application. Accordingly, the partner operator server 180 may store information related to the application data transmitted and/or received via its network for the application. The information may include a time of transmission, a quantity of data transmitted, a type of data transmitted, the application identifier, a device identifier for the device hosting the application, user information, or other data which can be used to effectively identify the source and/or quantity of data traffic for the application.

Message 864 and message 866 transmit the application response from the partner operator server 180 to the toll-free agent 300 via the access point 120. The toll-free agent 300 at message 868 will meter, monitor, log, or otherwise process the application response data. This may include counting the number of bytes received, identifying the content received, logging any errors obtained, and the like. Not shown is the periodic reporting of the usage data to the wholesale operator provider. The report may include an identification of the application, data monitored or logged, errors, wrapped application configuration (e.g., settings, version number), partner operator used for the connection, or other information related to the wrapped application 220.

Assuming the data connectivity policy has not been exceeded, the toll-free agent 300 may then transmit the application response to the application 218 via message 870.

Messaging 872 between the partner operator server 180 and the wholesale operator server 400 may be performed to reconcile the usage for the prepaid application 218. As discussed, the partner operator and the wholesale operator may have negotiated terms of access for the application. The terms may include a quantity of data (e.g., per user, per application, for the wholesale operator) or a value of data (e.g., maximum cost). The reconciliation process may include identifying the cost of service provided by the partner operator and generating a request for the amount. The basis for the cost may also be included in the request. The wholesale operator may compare the usage reported by the toll-free agent 300 with the usage reported by the partner operator. Any discrepancies may be handled through subsequent messaging between the partner operator server 180 and the wholesale operator server 400 or via a manual process. Although not shown in FIG. 8, the billing server 150 may be included in the reconciliation process.

Figure 9:
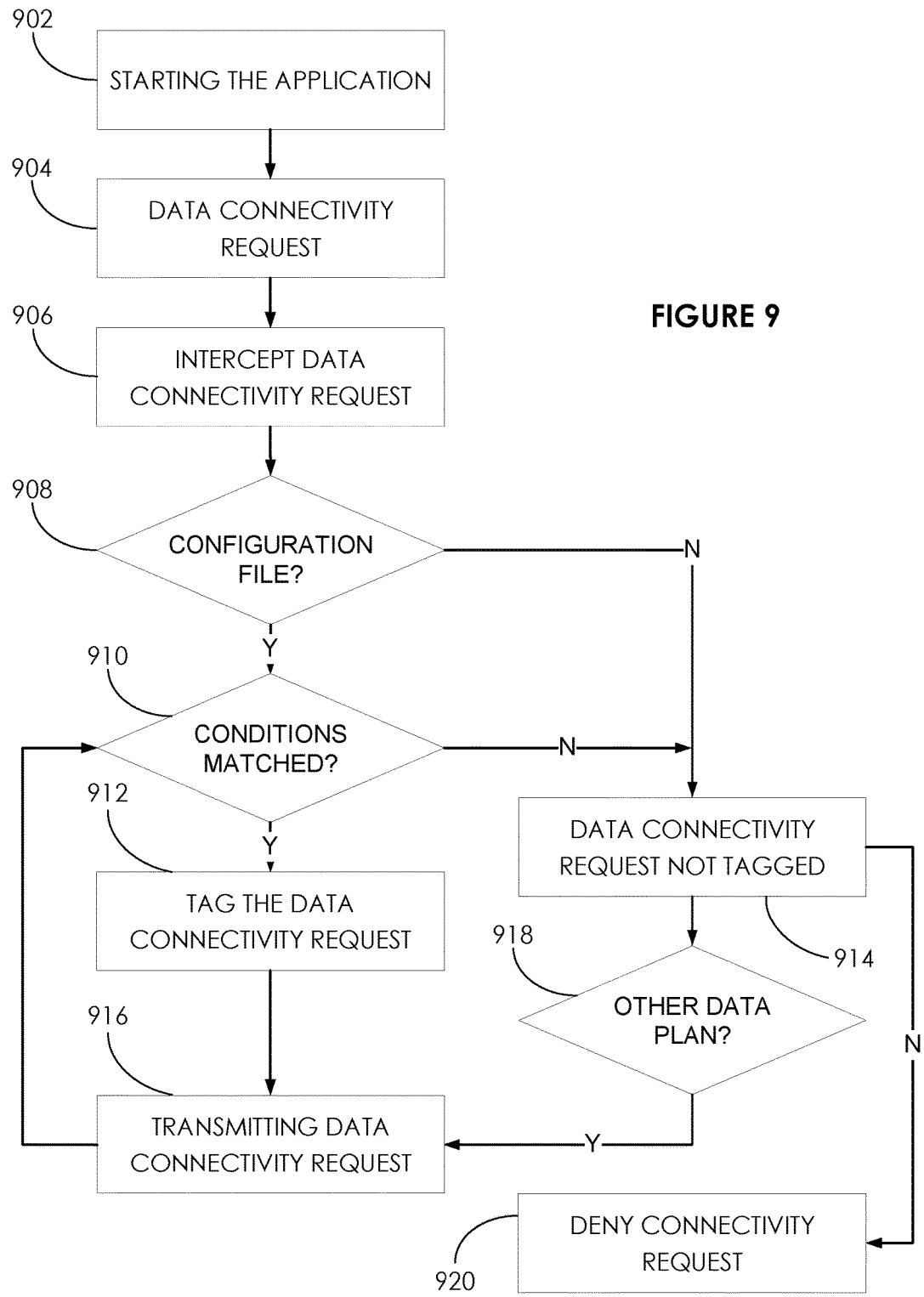
FIG. 9 is a process flow diagram for an example method of data transmission.

FIG. 9 is a process flow diagram for an example method of data transmission according to the present system. The method shown in FIG. 9 may be implemented via a communication device such as the communication device shown in FIG. 2.

The process begins at block 902 where an application 218 for the communication device is started. Starting an application may include, for example, executing the application or attaching a component to the communication device.

At block 904, the application 218 transmits a request for network access (e.g. a data connectivity request). The request may be seeking data network access. The request may include one or more of the application identifier, a destination address (e.g., IP address, canonical Internet address, SSID, port, protocol, or other destination identifier), and credential information (e.g., security token; digital certificate; etc.). The request may be transmitted via wired and/or wireless means.

At block 906, the network access request is intercepted by the toll-free agent 300. The toll-free agent 300 may monitor and control data transmitted by the application and data received for the application. The agent 300 may be transparent to the application as well as the device. In some implementations, the agent serves as a proxy for communication and other functions between the application and the communication device.

At block 908, the toll-free agent 300 will determine if a configuration may be found for the application that made the data connectivity request in block 902. Provided no configuration file may be found (answer No to block 908), the agent 300 will proceed to block 914, leaving the data connectivity request untagged or unchanged so that it can be seen by the wholesale operator server 400 as a regular connection request.

Provided a configuration file is found (answer Yes to block 908), the agent will proceed with block 910 to determine if the conditions of the configuration files are met/matched.

Provided they are met at block 910 (answer Yes), the toll-free agent 300 will at block 912 tag the data connectivity request with a first tag, i.e. the authorization token, making the request authorized. In other words, meeting the conditions of the configuration file means that the data connectivity request may be authorized under the operator specific billing conditions.

Provided the conditions are not met (answer No at block 910), the agent 300 will also proceed to block 914, leaving the data connectivity unchanged or untagged.

At block 916, the toll-free agent 300 will proceed with transmitting the data connectivity request, for instance to the access point 120, as described in relation to FIGS. 5 and 7. As seen before, further authorization/confirmation of the data connectivity request may be carried out at the access point 120, the partner network server 180 or wholesale server 400 level.

Going back to block 914, when the data connectivity request is not tagged, a determination is made at block 918 as to whether another data plan is available. The determination may be the simple acknowledgement of an existing data connectivity, e.g. a preliminary successful identification (including a data connection) with a network operator. Provided no other data plan is available (answer No to block 918), the data connectivity request may be denied in a further block 920. For instance, when no preliminary registration of the communication device to a data network has been granted, the data connectivity request will not be sent. When another data plan is available (answer Yes to block 920), the data connectivity request will be sent at block 916 using that other data plan.

Once transmitted, the process returns to block 910 to determine whether the connection remains authorized, e.g. whether the conditions of the configuration file are still met. Going back to the retail example, the conditions of the configuration file may specify that the application goes in the toll-free or prepaid mode if the location of the communication device remains proximate to the known location of a retail store (location conditions). The block 910 will correspond to comparing the reported location of the communication device with the retail store location. The comparison may be carried out at regular intervals or after capturing a large displacement of the device. When the communication device is determined to move away from the retail store location and the location conditions are no longer met, the process will proceed to block 914, and the application may switch back to a regular mode.

The authorization may expire for other various reasons, for instance the authorization limits (e.g., data quantity) may be exceeded, or an event may have occurred causing the authorization to terminate (e.g., powering down, handoff to a Wi-Fi network, handoff to a free network, change of location as seen above . . . ).

The configuration file may specify the additional events or conditions. They may also be configured by the user of the communication device so that a toll-free mode is not activated or does not remain active under specific events like a free network. For instance, the communication device may transition to a wireless network such as a free Wi-Fi network in an office or at home. As the device transitions, the need for "free" access may not be necessary as the device may be configured to freely access the Wi-Fi network. The data meter for the prepaid application 218 may be paused when switched to a regular mode, as a wholesale connection is no longer needed for the application. Should the device transition back to cellular/LTE access, a reauthorization may occur starting with block 910 as described above.

One may note that in the present description, the toll-free agent was illustrated as always "on". In an additional embodiment of the present system, the toll-free agent may be activated in a preliminary step. As long as the agent is not active, data activities from an application will be handled using the regular data plan from the communication device. The activation may be linked to a user activation or based on a triggering event, like detecting a roaming situation, or detecting a data plan about to run out (e.g. 75% of the data plan has been consumed).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like. Further, a "channel width" as used herein may encompass or may also be referred to as a bandwidth in certain aspects.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

In one or more aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Thus, in some aspects computer readable medium may comprise non-transitory computer readable medium (e.g., tangible media). In addition, in some aspects computer readable medium may comprise transitory computer readable medium (e.g., a signal). Combinations of the above should also be included within the scope of computer-readable media.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a device as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a device can obtain the various methods upon coupling or providing the storage means to the device.

Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

While the foregoing is directed to aspects of the present disclosure, other and further aspects of the disclosure may be devised without departing from the basic scope thereof, and the scope thereof is determined by the claims that follow.

The invention claimed is:

1. A device for providing data connectivity, the device comprising:
   a connection detector configured to receive a data connectivity request from an application installed on the device,
   a configuration manager for retrieving a configuration file for the application identified from the data connectivity request, the configuration file defining conditions to allow connectivity for the application under a billing plan specific to the application,
   an authorization module configured to:
      access the configuration file for the identified application,
      tag the data connectivity request with a tag if the data connectivity request matches the conditions of the configuration file, the tag being indicative of the billing plan specific to the application,
      leave the data connectivity request unchanged otherwise.

2. The device of claim 1, wherein the data connectivity request includes a packet data network destination address.

3. The device of claim 1, the authorization module being further configured to leave the data connectivity request unchanged when the configuration manager cannot retrieve a configuration file for the identified application.

4. The device of claim 1, wherein the application is associated to a content source, the configuration file defining a list of authorized content sources for the billing plan specific to the application.

5. The device of claim 1, wherein the conditions of the configuration file includes at least one of a data transmission amount, a received data amount, a data connection duration, a policy expiration time and the proximity to a given location.

6. The device of claim 1, wherein the authorization module is inactive, the device being further configured to activate the authorization module following the detection of a triggering event.

7. A method for providing data connectivity, the method being carried out by a communication device and comprising:
   receiving a data connectivity request from an application installed on the device,
   retrieving a configuration file for the application identified from the data connectivity request, the configuration file defining conditions to allow connectivity for the application under a billing plan specific to the application,
   tagging the data connectivity request with a tag if the data connectivity request matches the conditions of the configuration file, the tag being indicative of the billing plan specific to the application, leaving the data connectivity request unchanged otherwise.

8. A non-transitory computer-readable storage medium comprising instructions executable by a processor of an apparatus, the instructions causing the apparatus to:
    receive a data connectivity request from an application installed on the device,
    retrieve a configuration file for the application identified from the data connectivity request, the configuration file defining conditions to allow connectivity for the application under a billing plan specific to the application,
    tag the data connectivity request with a first tag if the data connectivity request matches the conditions of the configuration file, the tag being indicative of the billing plan specific to the application,
    leave the data connectivity request unchanged otherwise.

\* \* \* \* \*